United States Patent [19]

Hagiwara et al.

[11] Patent Number: 5,629,948

[45] Date of Patent: May 13, 1997

[54] DATA TRANSMISSION SCHEME WITH AUTOMATIC REPEAT REQUEST

[75] Inventors: Junichirou Hagiwara, Yokosuka; Kouichi Sawai; Shinji Uebayashi, both of Yokohama, all of Japan

[73] Assignee: NTT Mobile Communications Network Inc., Tokyo, Japan

[21] Appl. No.: 279,009

[22] Filed: Jul. 22, 1994

[30] Foreign Application Priority Data

Jul. 22, 1993 [JP] Japan .................................. 5-181257

[51] Int. Cl.⁶ .................................................. H04L 1/18
[52] U.S. Cl. ............................ 371/32; 371/34; 371/35
[58] Field of Search .............................. 371/32, 33, 35, 371/31, 34; 370/60, 75

[56] References Cited

U.S. PATENT DOCUMENTS

| | | | |
|---|---|---|---|
| 4,344,171 | 8/1982 | Lin | 371/35 |
| 4,439,859 | 3/1984 | Donnan | 371/32 |
| 4,584,685 | 4/1986 | Gajjar | 371/35 |
| 4,718,066 | 1/1988 | Rogard | 371/35 |
| 4,726,027 | 2/1988 | Nakamura et al. | 371/32 |
| 5,313,473 | 5/1994 | Darmon et al. | 371/35 |

FOREIGN PATENT DOCUMENTS

| | | |
|---|---|---|
| 3-98338 | 4/1991 | Japan . |
| 3-104335 | 5/1991 | Japan . |
| 4-253433 | 9/1992 | Japan . |
| 2248008 | 3/1992 | United Kingdom . |

OTHER PUBLICATIONS

Chandran et al.; "Selective–Repeat–ARQ Schemes for Broadcast Links"; IEEE Transactions on Communications, vol 40 No. 2; Jan. 1992.

Quernheim, V. et al.; "A New ARQ Scheme for Multicast Satellite Communication"; European Conf. on Satellite Communications; 1993.

IEEE Transactions on Communications, vol. COM–28, No. 3, Mar. 1980, pp. 395–401, S. Lin, et al., "An Effective Error Control Scheme for Satellite Communications".

IEEE Transactions on Communications, vol. 41, No. 4, Apr. 1993, pp. 513–523, G. Bennelli, "Some ARQ Protocols with Finite Receiver Buffer".

IBM Technical Disclosure Bulletin, vol. 24, No. 6, Nov. 1981, pp. 2886–2891, S. Lin, et al., "Preventive Error Control Scheme".

*Primary Examiner*—Paul P. Gordon
*Assistant Examiner*—Brian C. Oakes
*Attorney, Agent, or Firm*—Oblon, Spivak, McClelland, Maier & Neustadt, P.C.

[57] ABSTRACT

An ARQ data transmission scheme in which the overhead due to the ARQ control data is reduced to resolve the problem of the throughput deterioration. The error correction code for the original data is used for each re-transmission block or sub-block, and the block or sub-block corresponding to each re-transmission block or sub-block is found by carrying out the error correction operation with respect to each block or sub-block to be re-transmitted which is stored in the memory, so that there is no need to include the block or sub-block number for identifying each block or sub-block in the re-transmission frame, and consequently the ratio of the ARQ control data with respect to the transmission data can be made relatively smaller and the throughput can be improved.

20 Claims, 13 Drawing Sheets

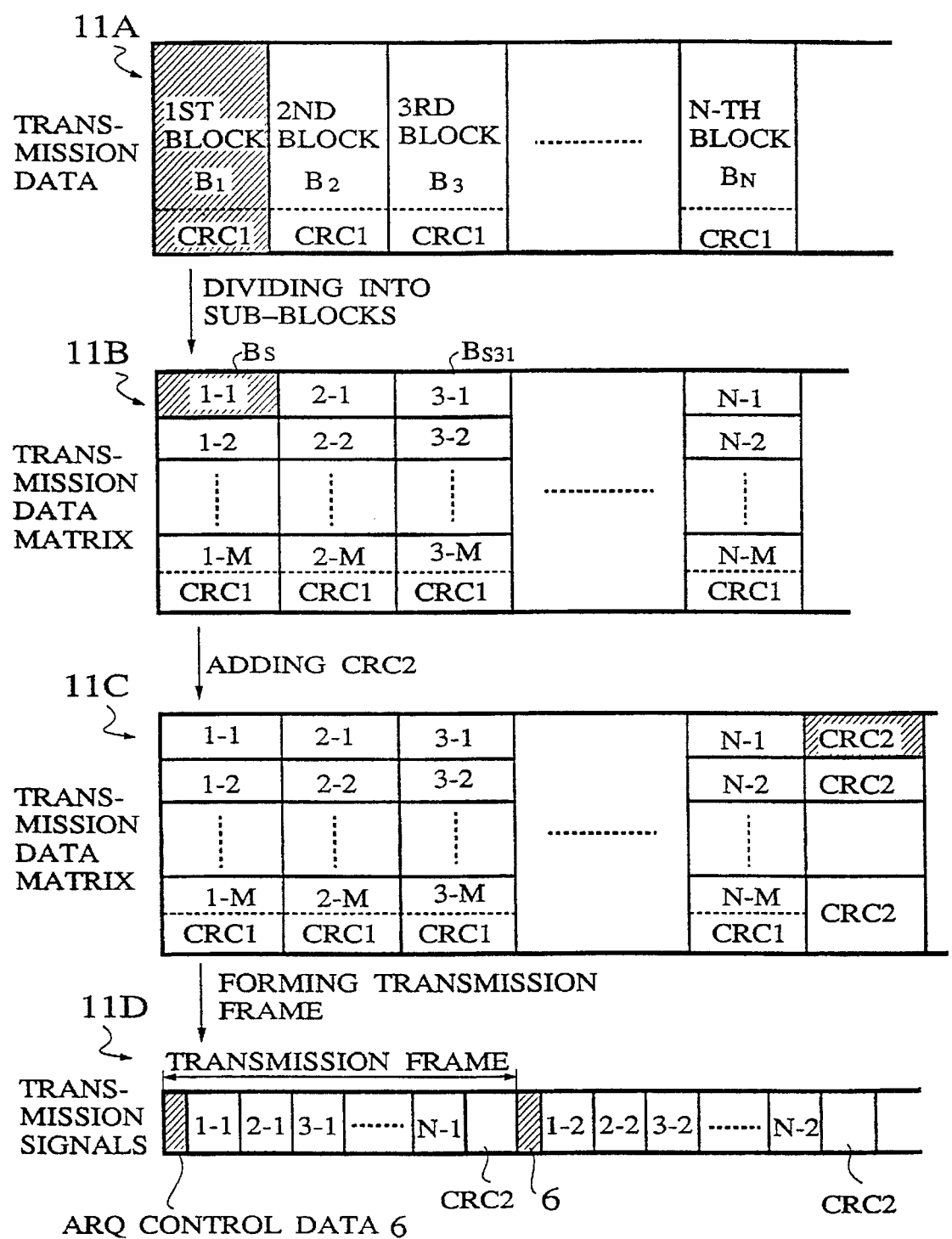

5,629,948

DATA TRANSMISSION SCHEME WITH AUTOMATIC REPEAT REQUEST

BACKGROUND OF THE INVENTION

1. Field of the Invention

The present invention relates to a data transmission scheme incorporating an automatic repeat request (ARQ) function in which the receiver side makes the re-transmission of the data portion originally transmitted with transmission errors to the transmitting side automatically.

2. Description of the Background Art

A typical data transmission system using the ARQ has a basic configuration as shown in FIG. 1, in which a transmission side data terminal 1 outputs the bit streams of the transmission data, which are them given to an ARQ transmitter 2. At the ARQ transmitter 2, the error detection codes such as the cyclic redundancy checking (CRC) codes are attached to the transmission data and resulting transmission signals in the ARQ frames are transmitted toward an ARQ receiver 4 on the reception side through a transmission path 3. Then, at the ARQ receiver 4, the presence of an error in each frame of the received signals is checked, and a re-transmission request signal is transmitted to the ARQ transmitter 2 whenever the error is detected. When there is no error detected in the received signals, the ARQ receiver 4 outputs the received data contained in the receive signals to a reception side data terminal 5, and transmits the successful reception signal to the ARQ transmitter 2.

Now, in the data transmission system using the conventional simple ARQ, the ARQ control data is attached to every re-transmission unit.

Namely, the transmission frame in the conventional simple ARQ scheme has a structure as shown in FIG. 1B, which comprises ARQ control data 6, transmission data 7, and error detection code 8, which are sequentially arranged in this order. Here, the ARQ control data 6 includes data for distinguishing the transmission and the re-transmission, and data for identifying the frame to be re-transmitted such as the frame number.

In the typical conventional simple ARQ scheme, the sequential timing chart for the data transmission operation appears as shown in FIG. 1C, which depicts an exemplary case of having an error in the second frame "2" and an error in its re-transmission frame as well. In this case, the transmission side transmits the transmission frames sequentially, starting from the first frame "1". At the reception side, the error detection code is decoded when each frame is received, and the presence of the error is checked. In a case no error is detected, it is regarded as correctly received, and an acknowledgement signal ACK accompanied by the frame number of the correctly received frame is returned to the transmission side. On the other hand, when the error is detected, a re-transmission request signal NAK (Negative Acknowledgement) accompanied by the frame number of the received error frame is returned to the transmission side. In response to this NAK signal, the transmission side re-transmits the frame specified by the frame number accompanying the NAK signal.

In an exemplary situation depicted in FIG. 1C, the re-transmission request signal NAK-2 for the second frame "2" is received at the transmission side while transmitting the fourth frame "4", so that the second frame "2" is re-transmitted immediately after the transmission of the fourth frame "4", and then the next fifth frame "5" is transmitted only after the re-transmission of the second frame "2". In this case, the error is also detected in the re-transmitted second frame "2", so that the re-transmission of this second frame "2" is requested again, and then the second frame "2" is finally received correctly by the re-re-transmission.

In this manner, in the conventional simple ARQ data transmission scheme, the ARQ control data 6 is attached to every frame which is a unit of re-transmission.

Now, there is another scheme called the hybrid ARQ type II scheme in which the transmission side which received the re-transmission request re-transmits the error correction code for the original data and the original data (i.e., the original frame itself) of the re-transmission requested frame alternately and repeatedly. In this hybrid ARQ type II scheme, the frame structure is similar as in a case of the simple ARQ scheme shown in FIG. 1B, which includes the ARQ control data, the transmission data, and the error detection code.

In this case of the hybrid ARQ type II scheme, the sequential timing chart for the data transmission operation appears as shown in FIG. 2, which depicts an exemplary case of having an error in the second frame "2" and an error in its re-transmission frame as well, just as in the case depicted in FIG. 1C. In this case, the transmission side transmits the transmission frames sequentially, starting from the first frame "1". At the reception side, the error detection code is decoded when each frame is received, and the presence of the error is checked. In a case no error is detected, it is regarded as correctly received, and an acknowledgement signal ACK accompanied by the frame number of the correctly received frame is returned to the transmission side. On the other hand, when the error is detected, a re-transmission request signal NAK accompanied by the frame number of the received error frame is returned to the transmission side, while this received error frame is stored in a memory along with its frame number.

When the re-transmission request signal NAK signal is received, the transmission side re-transmits the data correction code for the original data (e.g. the error correction code called the invertible code which has the same length as the original data) of the frame specified by the frame number accompanying the NAK signal in a case it is the (odd number)-th re-transmission for this frame, or the original data of this frame in a case it is the (even number)-th re-transmission for this frame. In an exemplary case depicted in FIG. 2, it is the first re-transmission for the second frame "2", so that the re-transmission frame "2'" is formed by attaching the ARQ control data and the error detection code to the error correction code of this frame "2", and this re-transmission frame "2'" is re-transmitted to the reception side.

When the re-transmission frame "2'" is received, the reception side reads out the error frame number from the ARQ control data in the re-transmission frame "2'", and then the presence of the error in the re-transmission frame "2'" is checked. In a case there is no error, the transmission data is recovered from the re-transmission frame "2'". Even in a case the data contained in the re-transmission frame "2'" is the error correction code for the original data, the reproduction of the data is possible by a prescribed operation as the error correction code having the same length as the original data is used. On the other hand, when the error is detected, the error correction operation is carried out by using the error frame "2" stored in the memory and the received re-transmission frame "2'", and then the error detection with the frame is carried out to check the result of the error correction operation. As a result, when there is no error within the frame, the error correction trial frame is adopted as the recovered frame "2", and the acknowledgement signal ACK for this frame "2" is returned to the transmission side. On the other hand, when there is an error within the frame even after the error correction operation, the error correction trial frame is not adopted as the recovered frame, and the error frame "2" stored in the memory is updated by the error re-transmission frame "2'" while the re-transmission request signal NAK for this frame "2" is returned to the transmission side again.

More specifically, in the exemplary situation depicted in FIG. 2, the operation proceeds as follows. First, when the re-transmission frame "2'" is received at the reception side, it is judged that this is the re-transmission of the frame "2" from the ARQ control data in the re-transmission frame "2'". Then, the error detection within the re-transmission frame "2'" is carried out (S1 in FIG. 2). In this example, the error is detected by this error detection within the frame, so that the error correction is carried out (S2 in FIG. 2) by using the frame "2" stored in the memory and the received re-transmission frame "2'", and then the error detection within the frame is carried out (S3 in FIG. 2). In this example, the error is detected even after the error correction (NG in FIG. 2), so that the error correction trial frame is not adopted as the recovered frame, and the re-transmission frame "2'" is stored in the memory (S4 in FIG. 2) over the frame "2", while the re-transmission request signal NAK-2 for this frame "2" is returned to the transmission side again.

At the transmission side, when this NAK-2 is received, the original data of the frame "2" is re-transmitted as it is the second re-transmission for this frame "2". When this re-transmitted frame "2" is received, the reception side judges that this is the re-transmission of the frame "2", and carries out the error detection within the frame for this re-transmitted frame "2" (S5 in FIG. 2). In this example, no error is detected (OK in FIG. 2), so that the received re-transmitted frame "2" is adopted as the recovered frame "2" while the acknowledgement signal ACK-2 for this frame "2" is returned to the transmission side.

Thus, in this hybrid ARQ type II scheme, not just the original data but also the error correction code for the original data are used as the re-transmission data, so that there are cases in which the data can be recovered even when the re-transmission data itself contains an error. However, even in this hybrid ARQ type II scheme, the ARQ control data is attached to every frame which is a unit of re-transmission.

Now, there is another scheme for reducing the size of the unit for transmission without increasing the number of error detection codes, by attaching the error detection codes two dimensionally.

The signal processing procedure at the transmission side in this ARQ scheme using two dimensionally attached error detection codes is shown in FIG. 3. In this case, the transmission data 11A is sequentially divided into a number of blocks B1 to BN of the identical size, and the first error correction code CRC1 is attached to each of the divided blocks B1 to BN. Then, each block Bi is further divided into M pieces of sub-blocks Bsi1 to BsiM to form the transmission data matrix 11B in which an arrangement of the sub-blocks Bsi1 to BsiM in each block Bi defining a column and an arrangement of the blocks B1 to BN defining a row. In this context, each column of this transmission data matrix 11B is referred as a first group of sub-blocks, while each row of this transmission data matrix 11B is referred as a second group of sub-blocks in the following. Next, a second error correction code CRC2 is attached to each second group of sub-blocks in the transmission data matrix 11B to form a full transmission data matrix 11C. Finally, each transmission frame is formed by attaching the ARQ control data 6 to each row of the full transmission data matrix 11C, and the transmission signals 11D is formed by arranging a number of transmission frames in series.

The signal processing procedure at the reception side in this ARQ scheme using two dimensionally attached error detection codes is shown in FIGS. 4A and 4B. In this case, from the reception signals shown in FIG. 4A, the reception signal matrix shown in FIG. 4B similar to the full transmission data matrix 11C of FIG. 3 is constructed. Then, the error detection codes CRC1 and CRC2 are decoded to check the presence of the error in each column and each row. For instance, in the exemplary case depicted in FIG. 4B, the first error detection code CRC1 on the second column and the second error detection code CRC2 on the first row contain errors (NG in FIG. 4B), so that the sub-block Bs21 located at the intersection of these second column and first row is identified as the error sub-block. When the error is detected as such, the reception side returns the re-transmission request signal for this error sub-block to the transmission side, and in response, the transmission side re-transmits the sub-block along with the ARQ control data. On the other hand, when there is no error, it is regarded as correctly received, and the received signals are outputted to the reception side data terminal in units of blocks. When the sub-block is re-transmitted, the re-transmitted sub-block is set in the appropriate position on the reception signal matrix and the error detection code checking is carried out again by using at least one of the first and second error detection codes CRC1 and CRC2, and the normal reception processing or the re-transmission request is carried out as in the above.

Thus, in this ARQ data transmission scheme using two dimensionally attached error detection codes, the size of the unit for transmission can be reduced without increasing the number of error detection codes. However, even in this ARQ scheme, the ARQ control data is attached to every sub-block which is a unit of re-transmission.

In general, in the ARQ data transmission scheme, the throughput can be improved by reducing the size of the unit of re-transmission, if the overhead due to the ARQ control data, the error detection codes, etc. is ignored.

However, in the conventional simple ARQ scheme, as the ARQ control data is to be attached to each unit of re-transmission, when the size of the unit of re-transmission is reduced, the overhead due to the ARQ control data becomes relatively large, and the throughput can be rather deteriorated because of this overhead due to the ARQ control data.

SUMMARY OF THE INVENTION

It is therefore an object of the present invention to provide an ARQ data transmission scheme in which the overhead due to the ARQ control data is reduced to resolve the problem of the throughput deterioration.

According to one aspect of the present invention there is provided a data transmission scheme using automatic repeat request function for automatically requesting a re-transmission of data received with an error at a reception side to a transmission side, comprising the steps of: (a) dividing transmission data into a plurality of blocks and attaching error detection code to each block to form a plurality of transmission blocks at the transmission side; (b) grouping N transmission blocks obtained at the step (a) together and attaching one ARQ control data to a group of N transmission blocks to form a transmission frame at the transmission side, where N is an integer; (c) transmitting transmission blocks of the transmission frame formed at the step (b) sequentially from the transmission side to the reception side; (d) detecting a presence of an error in each transmission block transmitted from the transmission side and received at the reception side at the step (c); (e) storing in a memory each transmission block for which the presence of the error is detected at the step (d) as an error block along with a block number identifying said each transmission block at the reception side, and returning a re-transmission request signal for the error block from the reception side to the transmission side; (f) producing an error correction code for each error block as a re-transmission block at the transmission side in response to the re-transmission request signal for said each error block returned at the step (e); (g) grouping M re-transmission blocks produced at the step (f) together and attaching one ARQ control data to a group of M re-transmission blocks to form a re-transmission frame at the transmission side, where M is an integer; (h) transmitting the re-transmission blocks of the re-transmission frame formed by the step (g) sequentially from the transmission side to the reception side whenever the re-transmission frame is formed at the step (g); (i) carrying out an error correction operation for each re-transmission block of the re-transmission frame transmitted from the transmission side and received at the reception side at the step (h) with respect to each error block stored in the memory to obtain an error correction trial block for each error block at the reception side; (j) judging each re-transmission block of the re-transmission frame transmitted from the transmission side and received at the reception side at the step (h) as a re-transmission block corresponding to one error block for which the error correction trial block obtained at the step (i) has no error at the reception side; and (k) adopting the error correction trial block for said one error block as a recovered block for said one error block at the reception side.

According to another aspect of the present invention there is provided a data transmission scheme using automatic repeat request function for automatically requesting a re-transmission of data received with an error at a reception side to a transmission side, comprising the steps of: (a) dividing transmission data into a plurality of transmission sub-blocks arranged in two dimensional matrix, and attaching a first error detection code to each group of transmission sub-blocks arranged in each column of the two dimensional matrix while attaching a second error detection code to each group of transmission sub-blocks arranged in each row of the two dimensional matrix at the transmission side; (b) forming a transmission frame by attaching one ARQ control data to each group of transmission sub-blocks arranged in each row of the two dimensional matrix at the transmission side; (c) transmitting transmission sub-blocks of the transmission frame formed at the step (b) sequentially from the transmission side to the reception side; (d) detecting a presence of an error in each transmission sub-block transmitted from the transmission side and received at the reception side at the step (c); (e) storing in a memory each transmission sub-block for which the presence of the error is detected at the step (d) as an error sub-block along with a sub-block number identifying said each transmission sub-block at the reception side and returning a re-transmission request signal for the error sub-block from the reception side to the transmission side; (f) producing an error correction code for each error sub-block as a re-transmission sub-block at the transmission side in response to the re-transmission request signal for said each error sub-block returned at the step (e); (g) grouping a plurality of re-transmission sub-blocks produced at the step (f) together and attaching one ARQ control data to said plurality of re-transmission sub-blocks to form a re-transmission frame at the transmission side; (h) transmitting the re-transmission sub-blocks of the re-transmission frame formed by the step (g) sequentially from the transmission side to the reception side whenever the re-transmission frame is formed at the step (g); (i) carrying out an error correction operation for each re-transmission sub-block of the re-transmission frame transmitted from the transmission side and received at the reception side at the step (h) with respect to each error sub-block stored in the memory to obtain an error correction trial sub-block for each error sub-block at the reception side; (j) judging each re-transmission sub-block of the re-transmission frame transmitted from the transmission side and received at the reception side at the step (h) as a re-transmission sub-block corresponding to one error sub-block for which the error correction trial sub-block obtained at the step (l) has no error according to at least one of the first and second error correction codes at the reception side; and (k) adopting the error correction trial sub-block for said one error sub-block as a recovered sub-block for said one error sub-block at the reception side.

According to another aspect of the present invention there is provided a data transmission system using automatic repeat request function for automatically requesting a re-transmission of data received with an error at a reception side to a transmission side, comprising: a transmission section including: first means for forming a transmission frame by dividing transmission data into a plurality of blocks, attaching error detection code to each block to form a plurality of transmission blocks, grouping N transmission blocks together, and attaching one ARQ control data to a group of N transmission blocks where N is an integer; second means for producing an error correction code for each error block occurring at the reception side as a re-transmission block in response to a re-transmission request signal for said each error block returned from the reception side; third means for forming a re-transmission frame by grouping M re-transmission blocks produced by the second means together and attaching one ARQ control data to a group of M re-transmission blocks where M is an integer; and transmitter means for transmitting transmission blocks of the transmission frame formed by the first means sequentially from the transmission side to the reception side, and transmitting the re-transmission blocks of the re-transmission frame formed by the third means sequentially from the transmission side to the reception side whenever the re-transmission frame is formed by the third means; and a reception section including: fourth means for detecting a presence of an error in each transmission block transmitted from the transmission side; memory for storing each transmission block for which the presence of the error is detected by the fourth means as an error block along with a block number identifying said each transmission block; fifth means for returning the re-transmission request signal for the error block to the transmission side; sixth means for carrying out an error correction operation for each re-transmission block of the re-transmission frame transmitted from the transmission side in response to the re-transmission request signal returned by the fifth means with respect to each error block stored in the memory to obtain an error correction trial block for each error block; seventh means for judging each re-transmission block of the re-transmission frame transmitted from the re-transmission side in response to the re-transmission request signal returned by the fifth means as a re-transmission block corresponding to one error block for which the error correction trial block obtained by the sixth means has no error; and eighth means for adopting the error correction trial block for said one error block obtained by the sixth means as a recovered block for said one error block.

Other features and advantages of the present invention will become apparent from the following description taken in conjunction with the accompanying drawings.

BRIEF DESCRIPTION OF THE DRAWINGS

FIG. 3 is a diagram of a signal processing procedure at the transmission side in the conventional ARQ data transmission scheme using two dimensionally attached error detection codes.

DETAILED DESCRIPTION OF THE PREFERRED EMBODIMENTS

Now, one embodiment of the ARQ data transmission scheme according to the present invention will be described in detail.

Figure 5A:
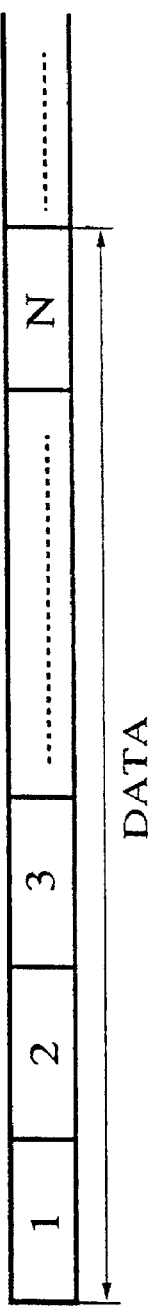
FIGS. 5A, 5B, and 5C are diagrams of transmission signal structure at various stages of a signal processing procedure at the transmission side in one embodiment of the ARQ data transmission scheme according to the present invention.
Figure 5B:
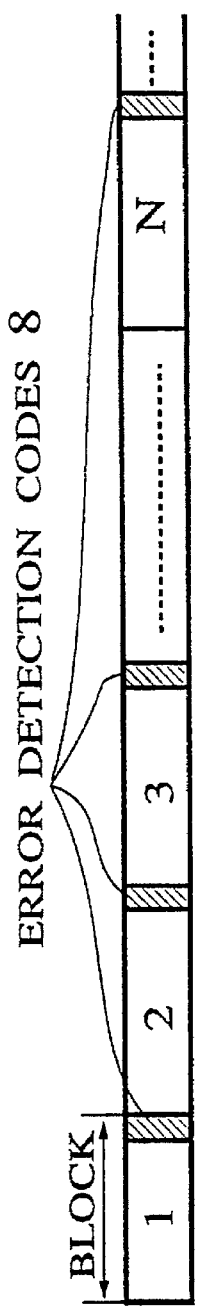
Figure 5C:
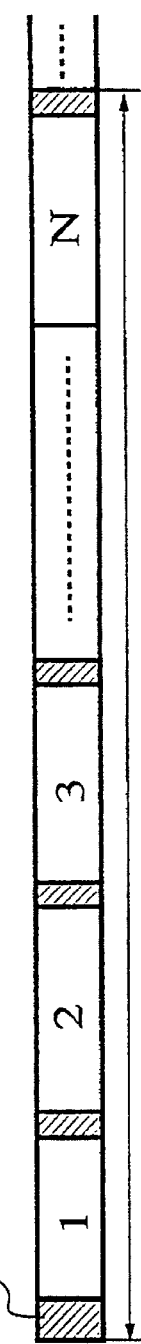

In this embodiment, the transmission side constructs the transmission signals as follows. First, as shown in FIG. 5A, the transmission data is divided into a number of sections of an identical equal length. Then, as shown in FIG. 5B, an error detection code 8 is attached to each divided section to form a transmission block. Finally, as shown in FIG. 5C, N such transmission blocks are grouped together and one ARQ control data 6 is attached to this group of N transmission blocks to form a transmission frame. Here, the ARQ control data in each transmission frame includes data for distinguishing the transmission and the re-transmission, and data indicating a top block number within this transmission frame. In a case of the re-transmission, the re-transmission frame is constructed by attaching one ARQ control data 6 to a group of M re-transmission blocks where each re-transmission block contains error correction code for the original data of each block requested to be re-transmitted. Here, no block number for identifying each re-transmission block in each re-transmission frame is required as will be described below.

Figure 6A:
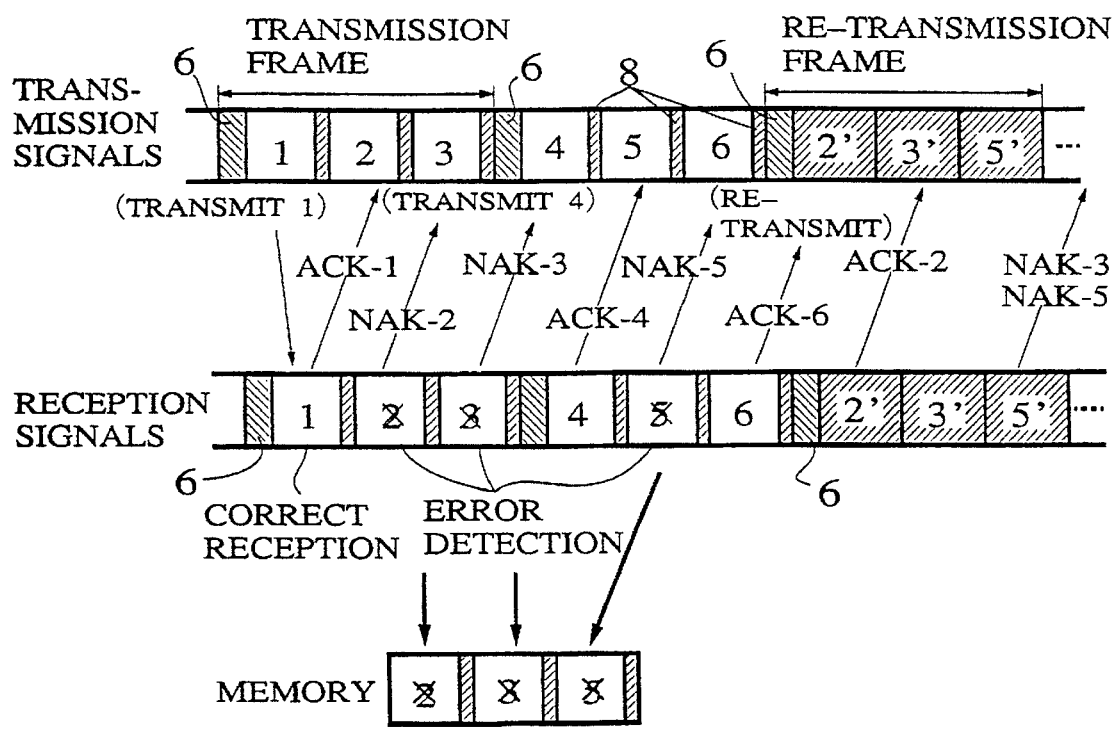
FIG. 6A is a sequential timing chart for the data transmission operation in one embodiment of the ARQ data transmission scheme according to the present invention.
Figure 6B:
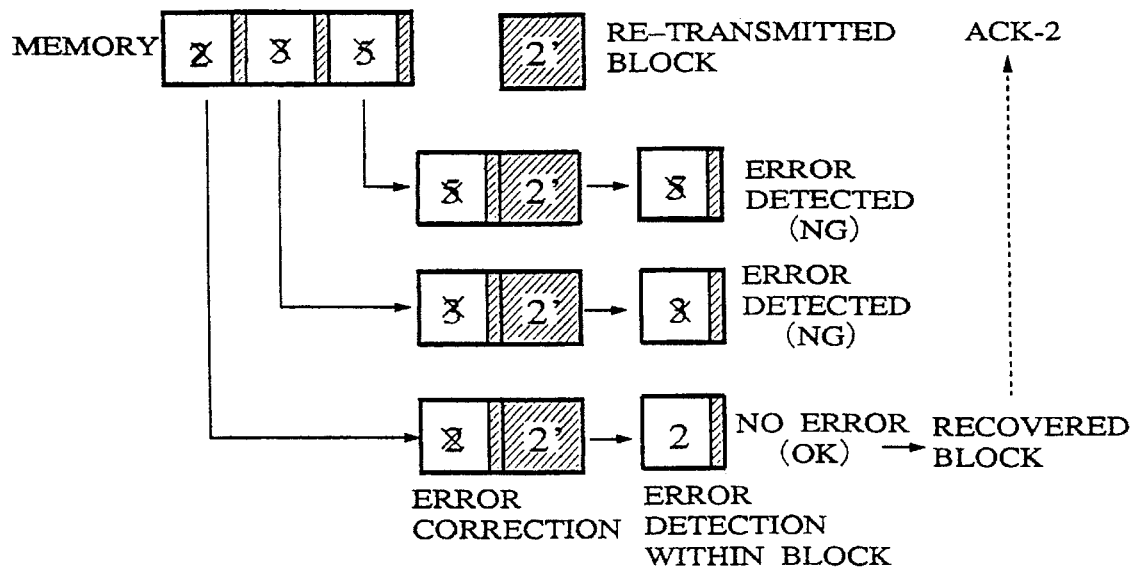
FIG. 6B is a diagrammatic chart for an initial error block recovery operation at the reception side in the data transmission operation of FIG. 6A.

In this embodiment, the sequential timing chart for the data transmission operation appears as shown in FIGS. 6A and 6B. These FIGS. 6A and 6B shown an exemplary case in which both the transmission frame length N and the re-transmission frame length M are set to 3, and the second and third blocks in the first frame and the fifth block in the second frame are error blocks which are not correctly received. In this case, the transmission side transmits the transmission blocks in the transmission frames sequentially, starting from the first block "1" in the first frame. At the reception side, the error detection code is decoded when each block is received, and the presence of the error is checked. In a case no error is detected, it is regarded as correctly received, and an acknowledgement signal ACK accompanied by the block number of the correctly received block is returned to the transmission side. On the other hand, when the error is detected, a re-transmission request signal NAK accompanied by the block number of the received error block is returned to the transmission side, while this received error block is stored in a memory along with its block number.

At the transmission side, the sequential transmission of the blocks is continued until the number of blocks for which the re-transmission request signals NAK have been returned but not responded yet reaches to the re-transmission frame length M=3.

When the number of blocks for which the re-transmission request signals NAK have been returned but not responded yet reaches to the re-transmission frame length M=3, the transmission side constructs the re-transmission frame as follows. Namely, the transmission side prepares the re-transmission block containing the error correction code for the original data of each block requested to be re-transmitted. Then, the re-transmission frame is constructed by grouping M re-transmission blocks together and attaching one ARQ control data 6 to this group of M re-transmission blocks. Here, the ARQ control data in each re-transmission frame includes no data for indicating a top block number within this re-transmission frame. In the exemplary case shown in FIG. 6A, the re-transmission blocks "2'", "3'", and "5'" containing the error correction codes for the original data of the error blocks "2", "3", and "5" are grouped together and the ARQ control data 6 without the data for indicating a top block number is attached to form the re-transmission frame. Then, the re-transmission blocks in the re-transmission frame is sequentially transmitted to the reception side.

At the reception side, when the re-transmission block "2'" is received, as shown in FIG. 6B, the error correction operation using the error correction code for the original data contained in the received re-transmission block "2'" is carried out with respect to each one of the error blocks "2", "3", and "5" stored in the memory. Thus, in the exemplary case shown in FIG. 6B, the error correction operation is carried out for a combination of the block "2'" and the block "2", a combination of the block "2'" and the block "3", and a combination of the block "2'" and the block "5". Then, the data and the error detection code are selected out of the error correction trial block resulting from each error correction operation, and the error detection within the block operation is carried out. Then, the error correction trial block without an error is adopted as the recovered block while the corresponding error block in the memory is deleted.

In other words, in this embodiment, each block in the re-transmission frame is judged as the re-transmission block corresponding to one of the error blocks stores in the memory with respect to which the error correction operation can be carried out successfully. Here, the error correction operations are carried out with respect to all the error blocks stored in the memory because the order of the re-transmission blocks in the re-transmission frame may be different from the order of the error blocks in the memory as the block number attached to the re-transmission request signal NAK may not be correctly received at the transmission side for example, and which re-transmission block in the re-transmission frame corresponds to which error block in the memory cannot be determined in advance since the re-transmission frame contains no block number for identifying each re-transmission block in each re-transmission frame as mentioned above.

Here, a care should be taken in a case there are more than one blocks without an error as a result of the error detection within the block operations for a certain re-transmission block. In such a case, it is impossible for the reception side to determine which one of these blocks is correctly error corrected. Consequently, in this embodiment, a simple scheme of not adopting any of these blocks as the recovered block in such a case is employed.

It is to be noted however that such a simple scheme may be modified as follows. Namely, whenever there are more than one blocks without an error as a result of the error detection within the block operations for a certain re-transmission block, the determination of the recovered block can be suspended until the checking operations for all the other re-transmission blocks in the same re-transmission frame are completed. Then, the checking operation for this certain re-transmission block can be retried again with respect to all the error blocks remaining in the memory after the completion of the checking operation for all the other re-transmission blocks. In this manner, there is a possibility that a number of the error blocks in the memory may be reduced by checking operations for all the other transmission blocks, such that the number of blocks without an error resulting from the checking operation for this certain re-transmission block may be reduced in the retry and it may be possible to determine the recovered block unambiguously.

In the exemplary case shown in FIG. 6B, after the error correction operations, only the block "2" has no error (OK in FIG. 6B) while the other blocks "3" and "5" have errors (NG in FIG. 6B) as a result of the error detection within block operations, so that the error correction trial block for this block "2" is adopted as the recovered block for the block "2", and the acknowledgement signal ACK-2 for this block "2" is returned to the transmission side accordingly. The similar operation is also carried out for the remaining error blocks "3" and "5" in the memory subsequently.

Figure 7A:
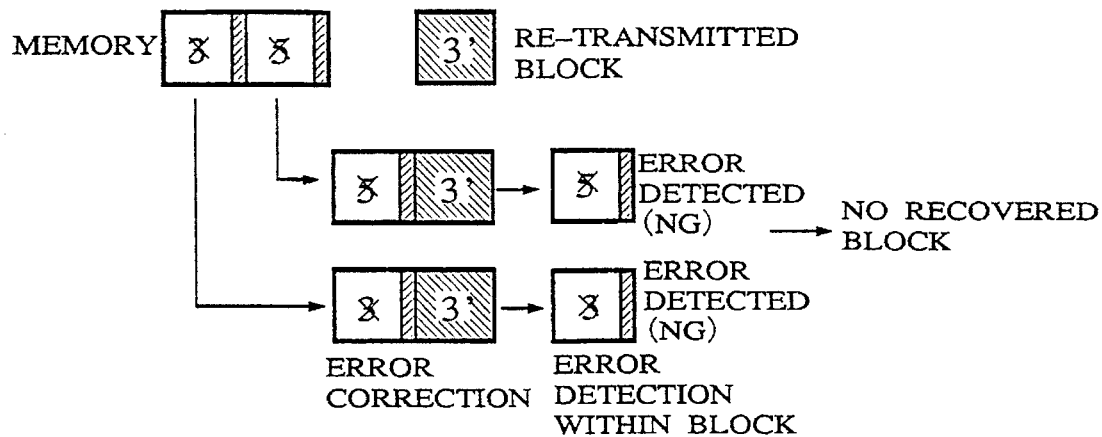
FIG. 7A is a diagrammatic chart for a subsequent error block recovery operation at the reception side in the data transmission operation of FIG. 6A.

FIG. 7A shows the checking operations for the re-transmission block "3'". In this case, similarly as in the case of the re-transmission block "2'" described above, the error correction operation using the error correction code for the original data contained in the received re-transmission block "3'" is carried out with respect to each one of the error blocks "3" and "5" stored in the memory. Thus, in the exemplary case shown in FIG. 7A, the error correction operation is carried out for a combination of the block "3'" and the block "3", and a combination of the block "3'" and the block "5". Then, the data and the error detection code are selected out of the error correction trial block resulting from each error correction operation, and the error detection within the block operation is carried out. In this case, there is no error correction trial block without an error as a result of the error detection within the block operations, so that no recovered block is obtained.

Figure 7B:
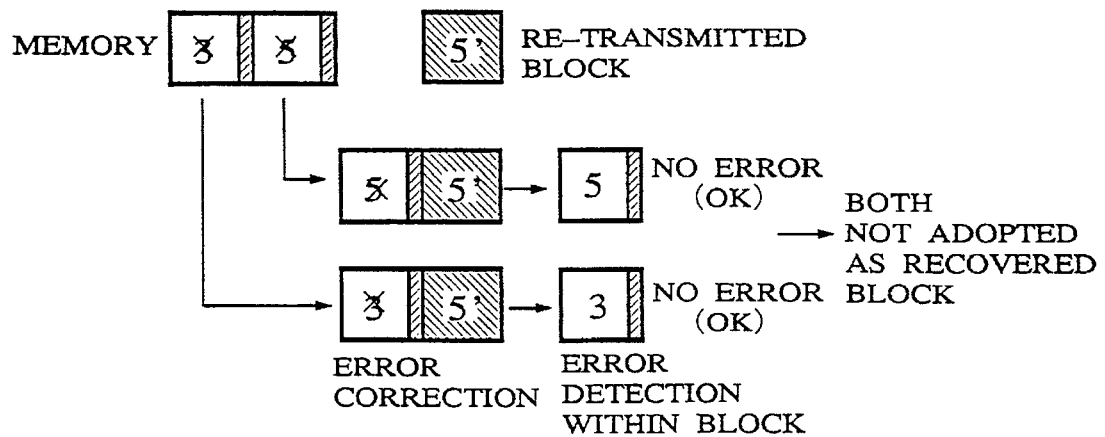
FIG. 7B is a diagrammatic chart for a subsequent error block recovery operation at the reception side in the data transmission operation of FIG. 6A.

FIG. 7B shows the checking operations for the re-transmission block "5'". In this case, similarly as in the case of the re-transmission block "2'" described above, the error correction operation using the error correction code for the original data contained in the received re-transmission block "5'" is carried out with respect to each one of the error blocks "3" and "5" stored in the memory. Thus, in the exemplary case shown in FIG. 7B, the error correction operation is carried out for a combination of the block "5'" and the block "3", and a combination of the block "5'" and the block "5". Then, the data and the error detection code are selected out of the error correction trial block resulting from each error correction operation, and the error detection within the block operation is carried out. In this case, both of the error correction trial blocks for the block "3" and the block "5" have no error as a result of the error detection within the block operations. Consequently, neither one of these error correction trial blocks is adopted as the recovered block according to the simple scheme described above.

As the checking operations for all the re-transmission blocks in the re-transmission frame are completed in this manner, the re-transmission request signals NAK for all the error blocks still remaining in the memory are returned to the transmission side. In this example, the re-transmission request signals NAK-3 and NAK-5 are returned to the transmission side as the block "3" and the block "5" are still remaining in the memory as the error blocks.

Figure 8:
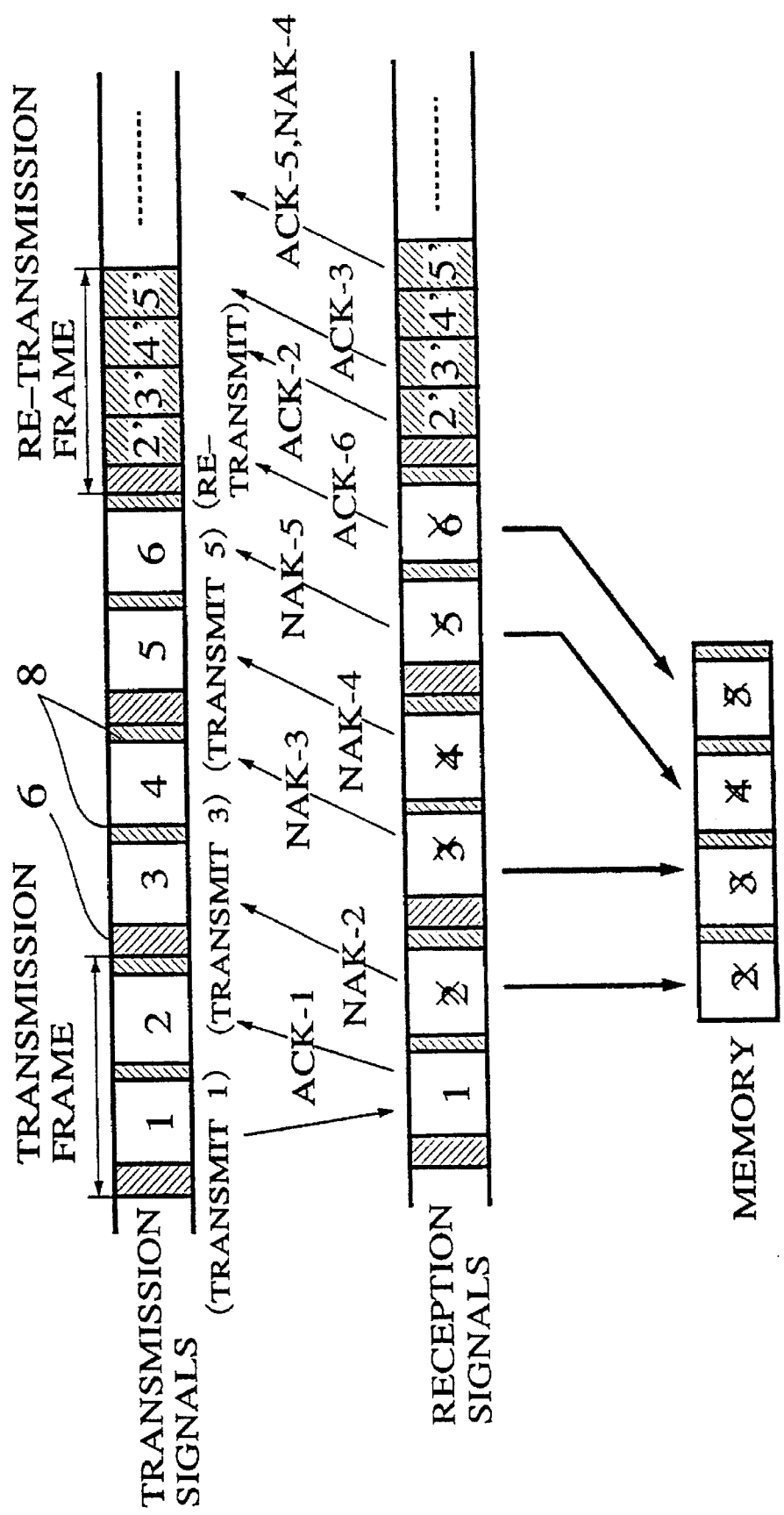
FIG. 8 is a sequential timing chart for the data transmission operation in one modification of the above embodiment of the ARQ data transmission scheme according to the present invention.
Figure 9A:
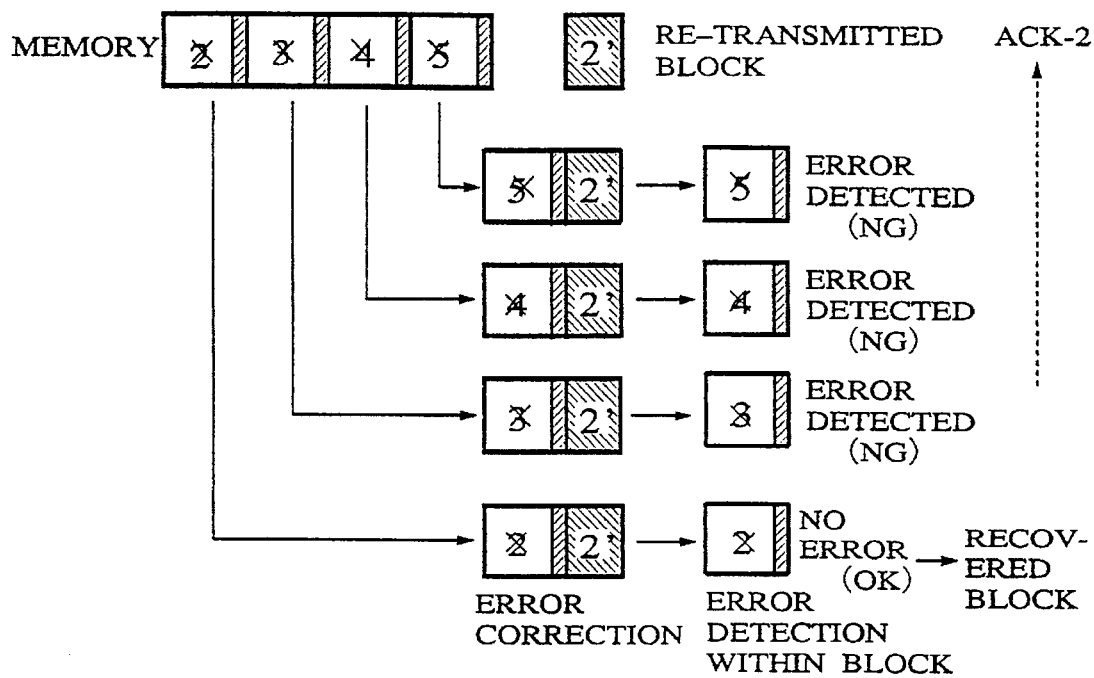
FIG. 9A is a diagrammatic chart for an initial error block recovery operation at the reception side in the data transmission operation of FIG. 8.
Figure 9B:
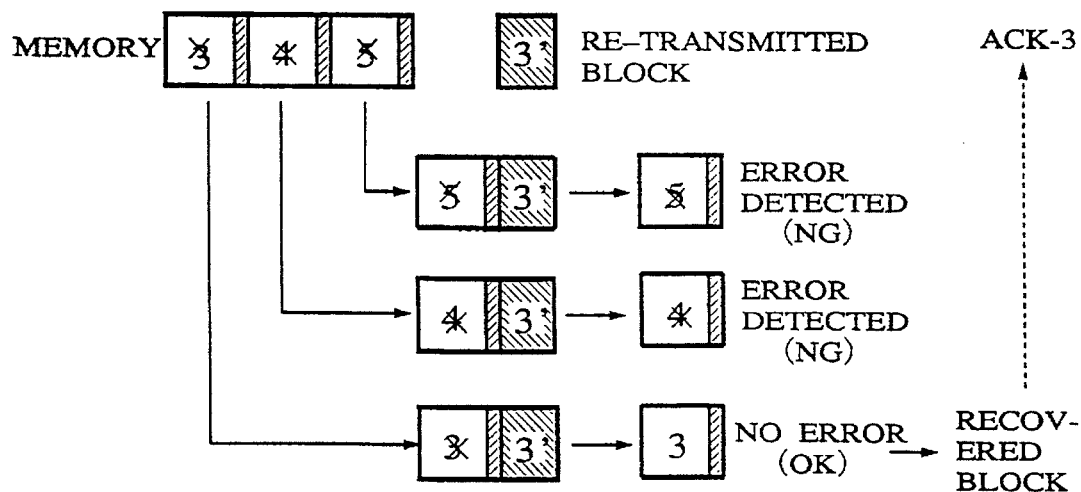
FIG. 9B is a diagrammatic chart for a subsequent error block recovery operation at the reception side in the data transmission operation of FIG. 8.
Figure 10A:
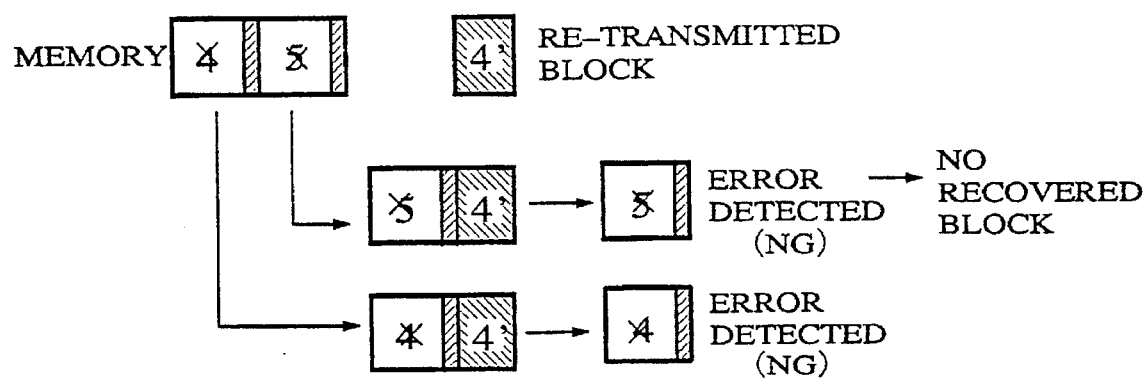
FIG. 10A is a diagrammatic chart for a subsequent error block recovery operation at the reception side in the data transmission operation of FIG. 8.
Figure 10B:
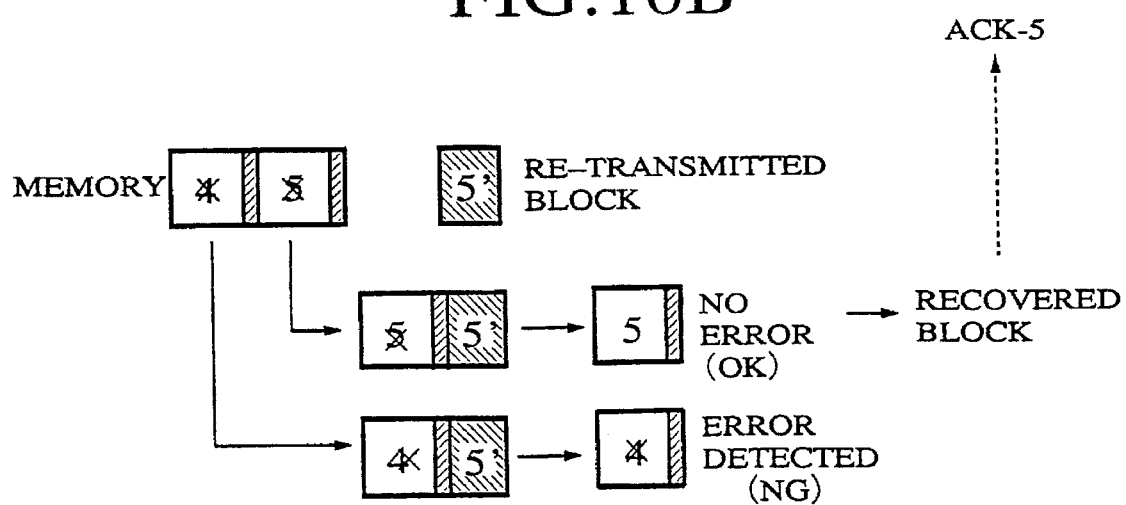
FIG. 10B is a diagrammatic chart for a subsequent error block recovery operation at the reception side in the data transmission operation of FIG. 8.

Next, FIG. 8 shows the sequential timing chart for the data transmission operation in another exemplary case in which a number of blocks M in the re-transmission frame is made to be twice as many as a number of blocks N in the transmission frame length while the re-transmission block length is made to be one half of the transmission block length. In this case, the frame structure, the manner of transmission and reception, the manner of re-transmission, and the manner of recovering the block are substantially similar to those in the above described case of FIG. 6A. More specifically, FIG. 8 shows a case in which N=2, M=2×N=4, and the second block in the first frame, the third and fourth blocks in the second frame, and the fifth and sixth blocks in the third frame are error blocks.

In this case, just as in the case of FIG. 6A described above, the acknowledgement signal ACK is returned for the correctly received block, and the re-transmission request signal NAK is returned for the error block. Here, however, as the re-transmission block length is one half of the transmission block length, the number of the re-transmission blocks that can be transmitted by one re-transmission frame is twice as many as the number of the transmission block that can be transmitted by one transmission frame of the same total length.

In this case, the checking operations for the re-transmission blocks at the reception side are carried out as shown in FIGS. 9A, 9B, 10A, and 10B, where the manner of recovering the block is substantially similar to that shown in FIGS. 6B, 7A, and 7B described above. Namely, for each re-transmission block, the error correction operation with respect to each error block in the memory is carried out, and the the error detection within the block operation is carried out for each resulting error correction trial block. The error correction trial block without an error is then adopted as the recovered block while the corresponding error block in the memory is deleted. Thus, in FIG. 9A, the recovered block for the block "2" is obtained from the re-transmission block "2'", and then in FIG. 9B, the recovered block for the block "3" is obtained from the re-transmission block "3'". On the other hand, in FIG. 10A, no recovered block is obtained from the re-transmission block "4'", whereas in FIG. 10B, the recovered block for block "5" is obtained from the re-transmission block "5'".

It is also possible to combine the above described ARQ data transmission scheme of the present invention with the ARQ scheme using two dimensionally attached error detection codes as described above in conjunction with FIG. 3, in order to reduce the size of the unit for transmission without increasing the number of error detection codes.

In this case, the transmission side sequentially divides the transmission data into a number of sub-blocks of the identical size, and the first error correction code CRC1 is attached to each first group of sub-blocks, while the second error correction code CRC2 is attached to each second group of sub-blocks to form the full transmission data matrix, and then each transmission frame formed by attaching the ARQ control data to each row of the full transmission data matrix is transmitted, just as in a case of FIG. 3 described above.

Figure 1A:
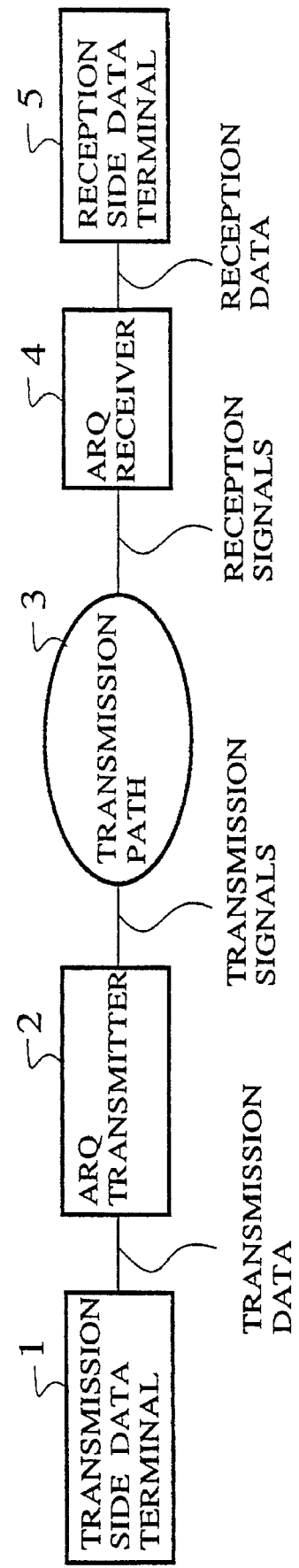
FIG. 1A is a schematic block diagram of a conventional ARQ data transmission system.
Figure 1B:
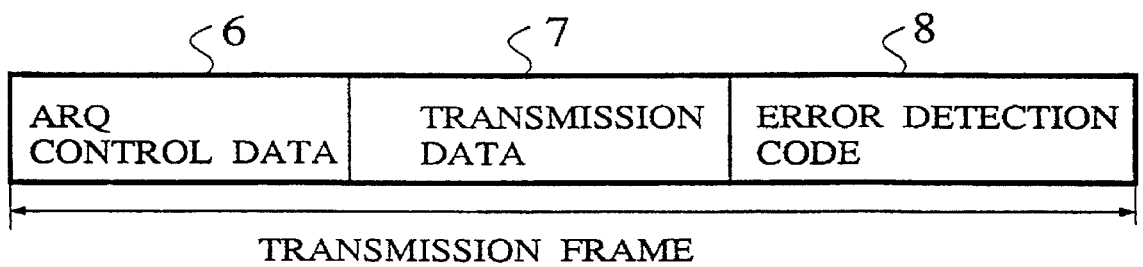
FIG. 1B is diagram of a transmission frame structure in the conventional ARQ data transmission system of FIG. 1A.
Figure 1C:
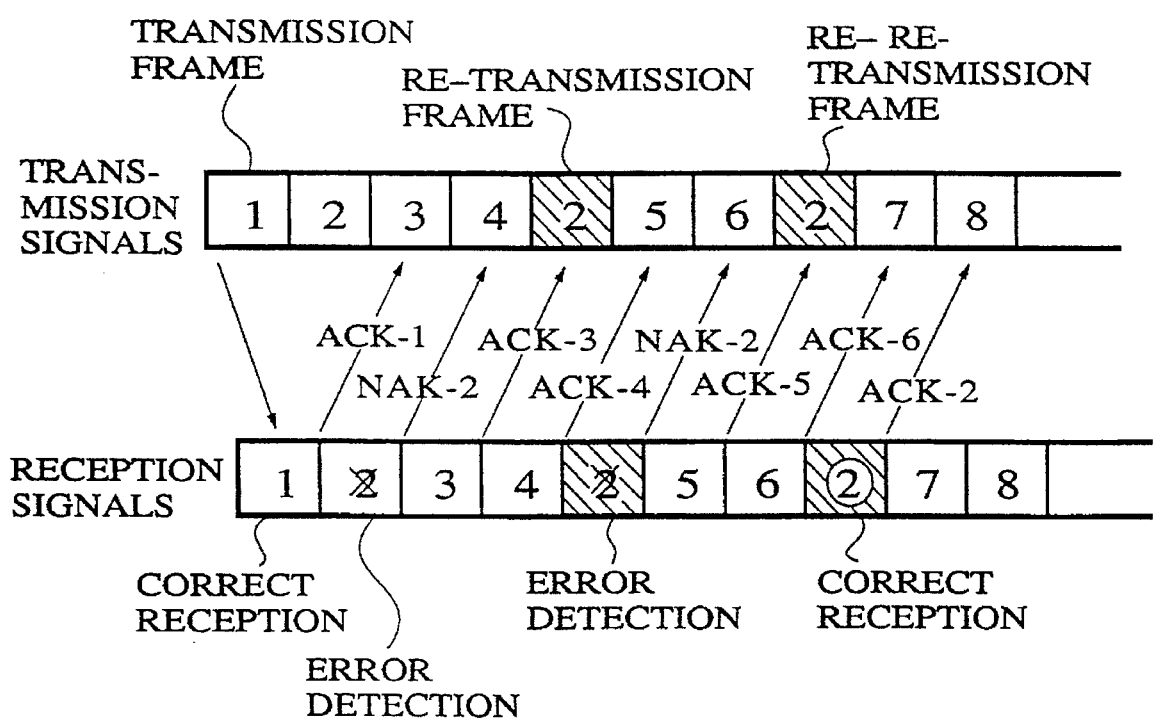
FIG. 1C is a sequential timing chart for the data transmission operation in the conventional ARQ data transmission system of FIG. 1A.
Figure 2:
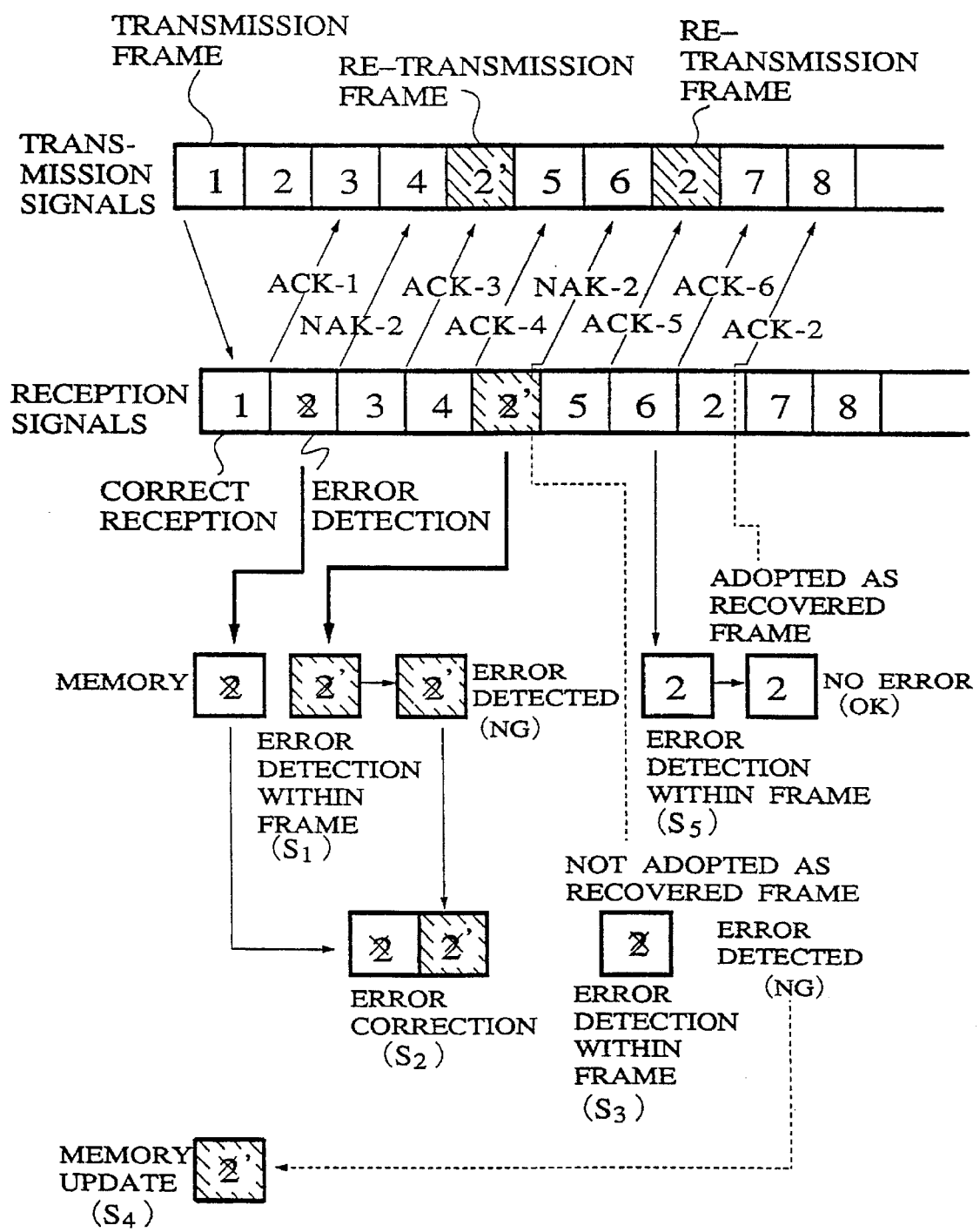
FIG. 2 is a sequential timing chart for the data transmission operation in the convention hybrid ARQ type II scheme.
Figure 4A:
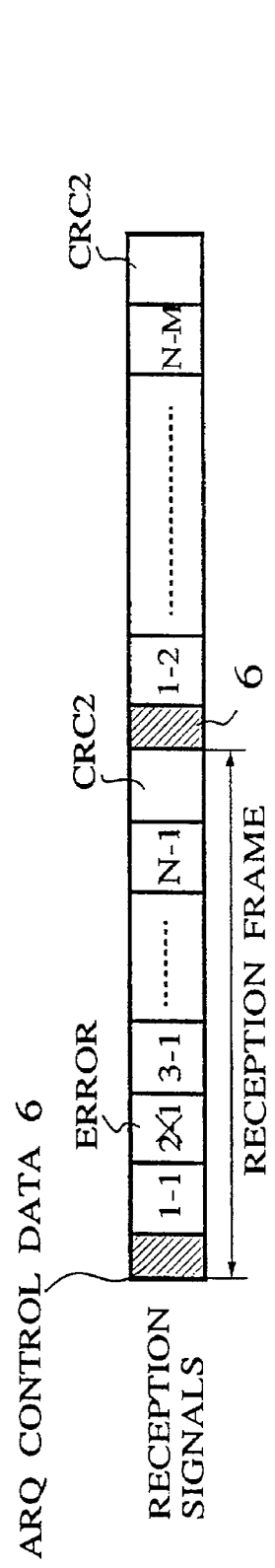
FIG. 4A is a diagram of a reception frame structure in the conventional ARQ data transmission scheme using two dimensionally attached error detection codes.
Figure 4B:
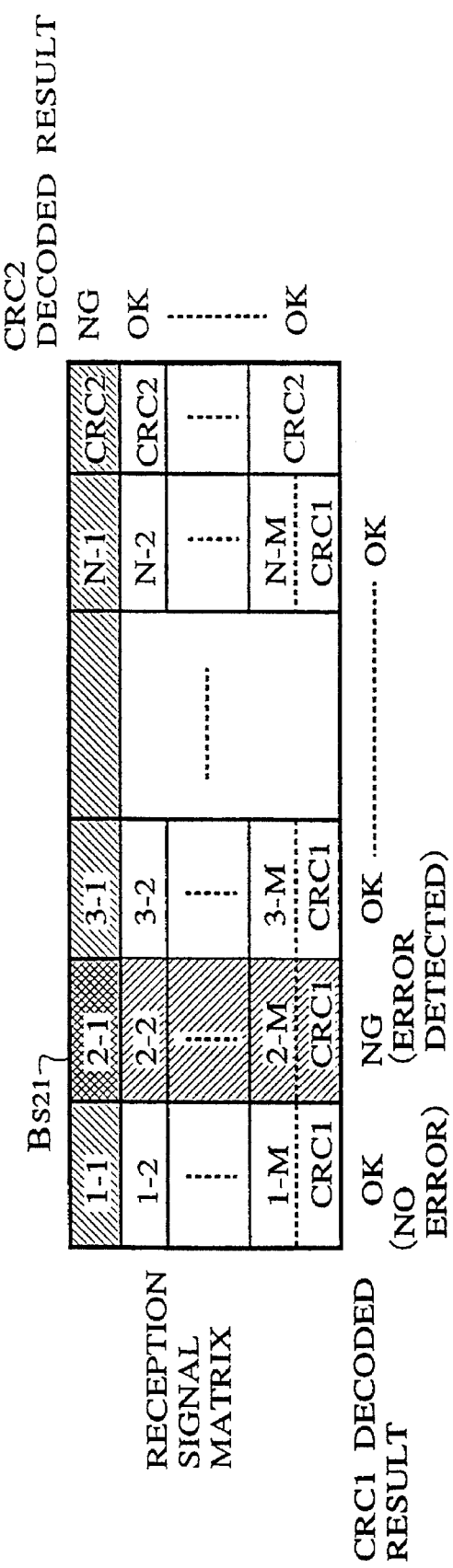
FIG. 4B is a diagram of a reception signal matrix obtained at the reception side in the conventional ARQ data transmission scheme using two dimensionally attached error detection codes.

At the reception side, the reception signal matrix as shown in FIG. 4B is constructed from the reception signals, and the error detection codes CRC1 and CRC2 are decoded to check the presence of the error in each column and each row and identify the error sub-block. Then, the re-transmission request signal NAK for the identified error sub-block is returned to the transmission side, while the error sub-block is stored in the memory along with its sub-block number.

In response, the transmission side prepares the re-transmission sub-block containing the error correction code for the original data of each sub-block requested to be re-transmitted and a re-transmission frame is constructed by grouping a prescribed number P of such re-transmission sub-blocks together and attaching one ARQ control data to this group of Pre-transmission sub-blocks, without attaching the sub-block number for each sub-block in the re-transmission frame, and then sequentially transmitted to the reception side.

Upon the reception of the re-transmission sub-blocks, at the reception side, the error correction operation using the error correction code for the original data contained in each received re-transmission sub-block is carried out with respect to each one of the error sub-blocks stored in the memory. Then, each resulting error correction trial sub-block is set in the appropriate position on the reception signal matrix and the error detection code checking is carried out again by using at least one of the first and second error detection codes CRC1 and CRC2, and the error correction trial sub-block without an error is adopted as the recovered sub-block, while the corresponding error sub-block in the memory is deleted.

In this case, as the error correction code for the original data is used for each re-transmission sub-block which is a unit of re-transmission, there is no need to include the sub-block number for each sub-block in the re-transmission frame. Thus, in this ARQ data transmission scheme according to the present invention using two dimensionally attached error detection codes, the overhead due to the error detection codes can also be reduced while also reducing the overhead due to the ARQ control data, so that the throughput can be improved further.

As described, according to the ARQ data transmission scheme of the present invention, the error correction code for the original data is used for each re-transmission block or sub-block, and the block or sub-block corresponding to each re-transmission block or sub-block is found by carrying out the error correction operation with respect to each block or sub-block to be re-transmitted which is stored in the memory, so that there is no need to include the block or sub-block number for identifying each block or sub-block in the re-transmission frame, and consequently the ratio of the ARQ control data with respect to the transmission data can be made relatively smaller and the throughput can be improved.

Figure 11A:
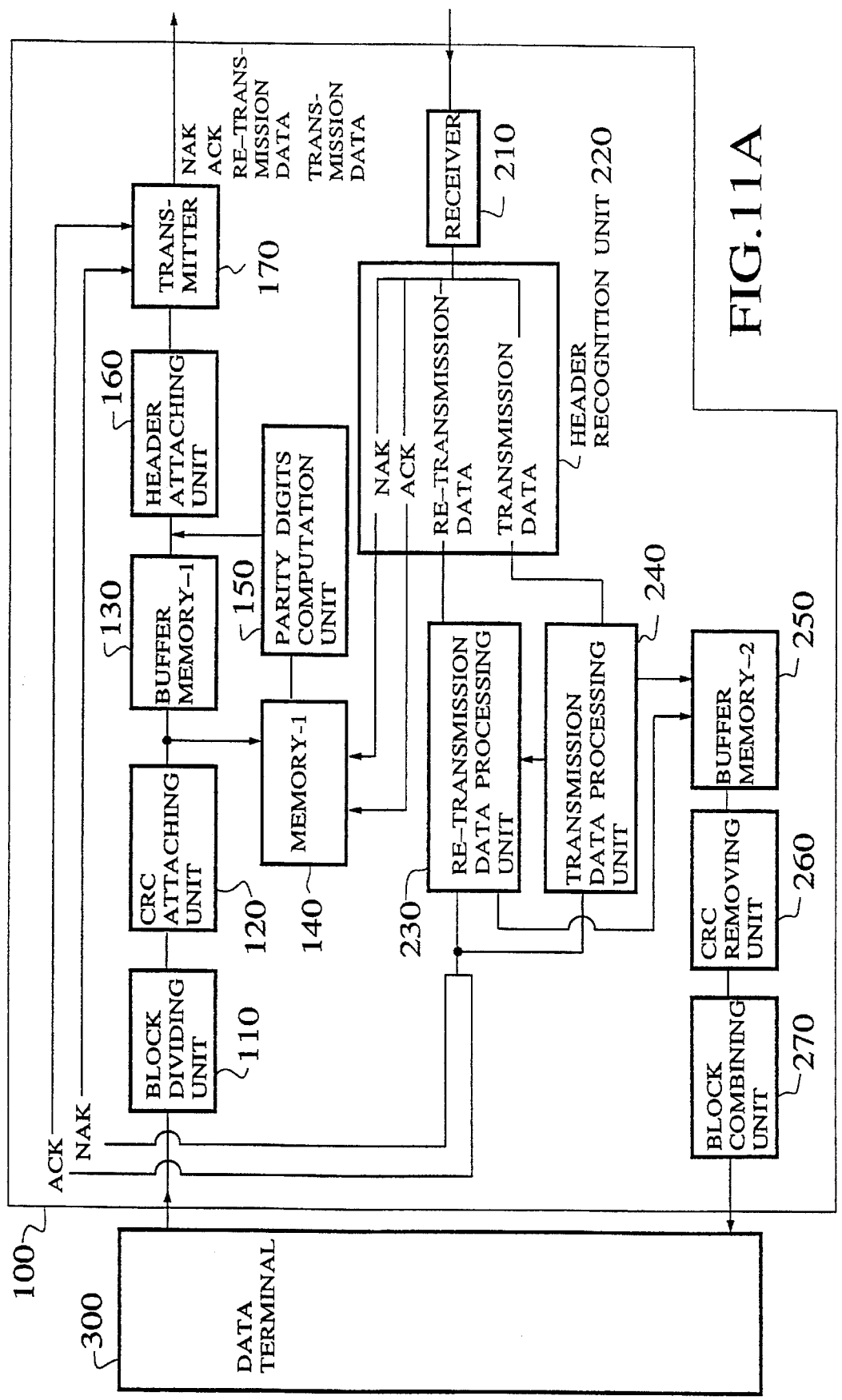
FIG. 11A is a block diagram of an exemplary configuration of an ARQ data transmission system according to the present invention.

It is to be noted that the ARQ data transmission scheme of the present invention as described above can be realized by using an ARQ data transmission system as shown in FIG. 11A, which generally comprises an ARQ transmitter and receiver 100 connected with a data terminal 300.

A transmission section of the ARQ transmitter and receiver 100 includes a block dividing unit 110 for dividing the transmission data supplied from the data terminal 300 into a number of blocks as shown in FIG. 5A, a CRC attaching unit 120 for attaching the CRC code to each block as the error detection code as shown in FIG. 5B, a buffer memory-1 for buffering the transmission blocks, a memory-1 140 for storing the transmission blocks and selectively deleting the stored transmission block identified by the acknowledgement signal ACK received from the reception side or selectively outputting the stored transmission block identified by the re-transmission request signal NAK received from the reception side, a parity digits computation unit 150 for obtaining the error correction codes for the transmission block selectively outputted from the memory-1 140, a header attaching unit 160 for attaching the header containing the ARQ control data to either a group of the transmission blocks or a group of error correction codes to form a transmission frame as shown in FIG. 5C, and a transmitter 170 for transmitting the transmission frames sequentially as the transmission signals to the reception side, according to the acknowledgement signal ACK or the re-transmission request signal NAK received from the reception section as described below.

Figure 11B:
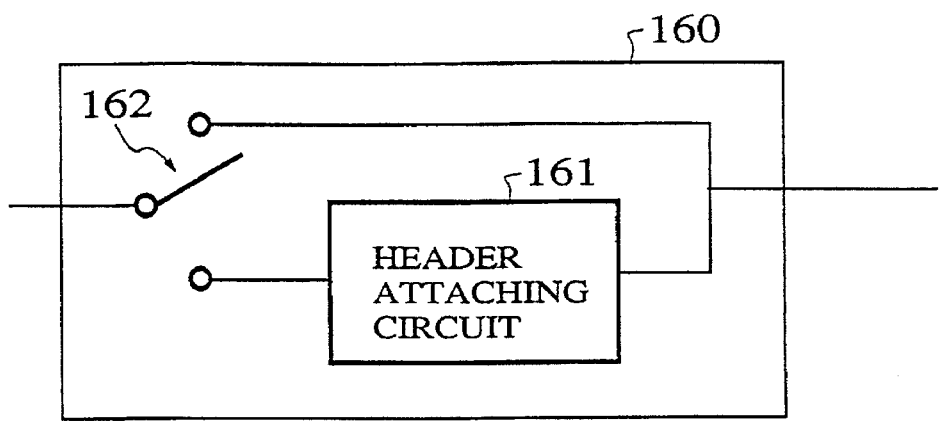
FIG. 11B is a block diagram of a header attaching unit in the ARQ data transmission system of FIG. 11A.

Here, as shown in FIG. 11B, the header attaching unit 160 further comprises a switch 162 for selectively supplying each transmission block from the buffer memory-1 130 or each error correction code from the parity digits computation unit 150 to a header attaching circuit 161, such that the header attaching circuit 161 attaches the header containing the ARQ control data only to a top of each transmission or re-transmission frame.

A reception section of the ARQ transmitter and receiver 100 includes a receiver 210 for receiving the signals transmitted from the transmission side, a header recognition unit 220 separates the received signal into the acknowledgement signal ACK, the re-transmission request signal NAK, the transmission data, and the re-transmission data. The acknowledgement signal ACK or the re-transmission request signal NAK separated from the received signal is supplied to the memory-1 140 of the transmission section. On the other hands, the re-transmission data and the transmission data are supplied to a re-transmission data processing unit 230 and a transmission data processing unit 240, respectively.

The re-transmission data processing unit 230 carries out the error correction operation on the entered re-transmission data, and then carries out the CRC checking operation corresponding to the error detection within the block operation described above on the error correction trial block obtained by the error correction operation. The transmission data processing unit 240 carries out the CRC checking operation on the entered transmission data. Then, the re-transmission data processing unit 230 or the transmission data processing unit 240 outputs the acknowledgement signal ACK or the re-transmission request signal NAK to the transmitter 170 of the transmission section according to the result of the checking operations carried out therein. Here, the transmission data processing unit 240 also outputs the received blocks in any case, while the re-transmission data processing unit 230 outputs only the recovered blocks. If the received blocks are not recovered, the re-transmission data processing unit 230 outputs no block.

The reception section further includes a buffer memory-2 250 for buffering the received blocks from the re-transmission data processing unit 230 or the transmission data processing unit 240, a CRC removing unit 260 for removing the CRC code from each received block, and a block combining unit 270 for combining the received blocks to construct the received data to be supplied to the data terminal 300.

Figure 11C:
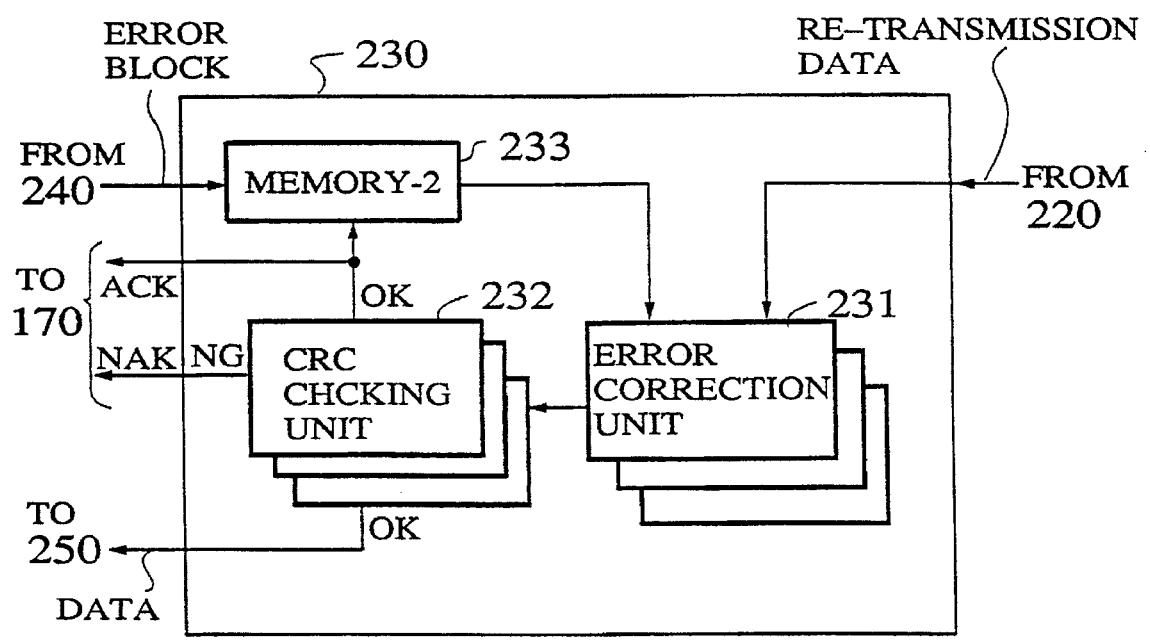
FIG. 11C is a block diagram of a re-transmission data processing unit in the ARQ data transmission system of FIG. 11A.

Here, as shown in FIG. 11C, the re-transmission data processing unit 230 further comprises an error correction unit 231 for carrying out the error correction operation for the received re-transmission data with respect to each error block in the memory-2 233, a CRC checking unit 232 for carrying out the error detection within the block operation to each error correction trial block obtained by the error correction unit 231, and a memory-2 233 for storing the error blocks detected by the checking operations in the transmission data processing unit 240. This memory-2 233 corresponds to the memory referred in the embodiments of FIG. 5A to 10B described above. When the recovered data is obtained, the CRC checking unit 232 outputs the acknowledgement signal ACK to the transmitter 170 and the recovered data to the buffer memory-2 250 while deleting the corresponding error block in the memory-2 233 On the other hand, when the recovered data is not obtained, the CRC checking unit 232 outputs the re-transmission request signal NAK to the transmitter 170.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed:

1. A data transmission scheme using automatic repeat request function for automatically requesting re-transmission of data received with an error at a reception side to a transmission side, comprising the steps of:

(a) dividing transmission data into a plurality of blocks and attaching error detection code to each block to form a plurality of transmission blocks at the transmission side;

(b) grouping N transmission blocks obtained at the step (a) together and attaching one ARQ control data to a group of N transmission blocks to form a transmission frame at the transmission side, where N is an integer;

(c) transmitting transmission blocks of the transmission frame formed at the step (b) sequentially from the transmission side to the reception side;

(d) detecting a presence of an error in each transmission block transmitted from the transmission side and received at the reception side at the step (c);

(e) storing in a memory each transmission block for which the presence of the error is detected at the step (d) as an error block along with a block number identifying said each transmission block at the reception side, and returning a re-transmission request signal for the error block from the reception side to the transmission side;

(f) producing an error correction code for each error block as a re-transmission block at the transmission side in response to the re-transmission request signal for said each error block returned at the step (e);

(g) grouping M re-transmission blocks produced at the step (f) together and attaching one ARQ control data to a group of M re-transmission blocks to form a re-transmission frame at the transmission side, where M is an integer greater than 1;

(h) transmitting the re-transmission blocks of the re-transmission frame formed by the step (g) sequentially from the transmission side of the reception side whenever the re-transmission frame is formed at the step (g);

(i) carrying out an error correction operation for each re-transmission block of the re-transmission frame transmitted from the transmission side and received at the reception side at the step (h) with respect to each error block stored in the memory to obtain an error correction trial block for each error block at the reception side;

(j) judging each re-transmission block of the re-transmission frame transmitted from the transmission side and received at the reception side at the step (h) as corresponding to a respective error block when the error correction trial block obtained at the step (i)

using the respective re-transmission block has no error at the reception side; and (k) adopting the error correction trial block judged in step (j) for said respective error block as a recovered block for said one error block at the reception side.

2. The data transmission scheme of claim 1, further comprising the step of:

between steps (d) and (e), receiving each transmission block for which the presence of the error is not detected at the step (d) as a correctly received block at the reception side, and returning an acknowledge signal for the correctly received block from the reception side to the transmission side.

3. The data transmission scheme of claim 1, wherein the step (k) also returns an acknowledge signal for said one error block from the reception side to the transmission side.

4. The data transmission scheme of claim 1, further comprising the steps of:

(l) after the step (k), deleting said one error block in the memory; and (m) after the steps (i), (j), (k), and (l) are carried out for all the re-transmission blocks of the re-transmission frame transmitted from the transmission side and received at the reception side at the step (h), returning a re-transmission request signal for each error block which is still remaining in the memory from the reception side to the transmission side.

5. The data transmission scheme of claim 1, wherein the step (k) adopts the error correction trial block for said one error block as a recovered block for said one error block only when the step (j) judges that there is no other error block for which the error correction trial block obtained at the step (i) has no error.

6. The data transmission scheme of claim 1, wherein the ARQ control data of each transmission frame formed at the step (b) includes data for distinguishing each transmission frame from each re-transmission frame formed at the step (g) and data for identifying the transmission blocks contained in each transmission frame, whereas the ARQ control data of each re-transmission frame formed at the step (g) includes only data for distinguishing each re-transmission frame from each transmission frame formed at the step (b).

7. The data transmission scheme of claim 1, wherein M used in the step (g) is greater than N used in the step (b).

8. A data transmission scheme using automatic repeat request function for automatically requesting a re-transmission of data received with an error at a reception side to a transmission side, comprising the steps of:

(a) dividing transmission data into a plurality of transmission sub-blocks arranged in two dimensional matrix, and attaching a first error detection code to each group of transmission sub-blocks arranged in each column of the two dimensional matrix while attaching a second error detection code to each group of transmission sub-blocks arranged in each row of the two dimensional matrix at the transmission side;

(b) forming a transmission frame by attaching one ARQ control data to each group of transmission sub-blocks arranged in each row of the two dimensional matrix at the transmission side;

(c) transmitting transmission sub-blocks of the transmission frame formed at the step (b) sequentially from the transmission side to the reception side;

(d) detecting a presence of an error in each transmission sub-block transmitted from the transmission side and received at the reception side at the step (c);

(e) storing in a memory each transmission sub-block for which the presence of the error is detected at the step (d) as an error sub-block along with a sub-block number identifying said each transmission sub-block at the reception side, and returning a re-transmission request signal for the error sub-block from the reception side to the transmission side;

(f) producing an error correction code for each error sub-block as a re-transmission sub-block at the transmission side in response to the re-transmission request signal for said each error sub-block returned at the step (e);

(g) grouping a plurality of re-transmission sub-blocks produced at the step (f) together and attaching one ARQ control data to said plurality of re-transmission sub-blocks to form a re-transmission frame at the transmission side;

(h) transmitting the re-transmission sub-blocks of the re-transmission frame formed by the step (g) sequentially from the transmission side to the reception side whenever the re-transmission frame is formed at the step (g);

(i) carrying out an error correction operation for each re-transmission sub-block of the re-transmission frame transmitted from the transmission side and received at the reception side at the step (h) with respect to each error sub-block stored in the memory to obtain an error correction trial sub-block for each error sub-block at the reception side;

(j) judging each re-transmission sub-block of the re-transmission frame transmitted from the transmission side and received at the reception side at the step (h) as corresponding to a respective error sub-block when the error correction trial sub-block obtained at the step (i) using respective re-transmission sub-block has no error according to at least one of the first and second error correction codes at the reception side; and (k) adopting the error correction trial sub-block judged in step (j) for said respective error sub-block ss a recovered sub-block for said one error sub-block at the reception side.

9. The data transmission scheme of claim 8, further comprising the step of:

between steps (d) and (e), receiving each transmission sub-block for which the presence of the error is not detected at the step (d) as a correctly received sub-block at the reception side, and returning an acknowledge signal for the correctly received sub-block from the reception side to the transmission side.

10. The data transmission scheme of claim 8, wherein the step (k) also returns an acknowledge signal for said one error sub-block from the reception side to the transmission side.

11. The data transmission scheme of claim 8, further comprising the steps of:

(l) after the step (k), deleting said one error sub-block in the memory; and (n) after the steps (i), (j), (k), and (m) are carried out for all the re-transmission sub-blocks of the re-transmission frame transmitted from the transmission side and received at the reception side at the step (h), returning a re-transmission request signal for each error sub-block which is still remaining in the memory from the reception side to the transmission side.

12. The data transmission scheme of claim 8, wherein the step (k) adopts the error correction trial sub-block for said one error sub-block as a recovered sub-block for said one error sub-block only when the step (j) judges that there is no other error sub-block for which the error correction trial sub-block obtained at the step (i) has no error.

13. The data transmission scheme of claim 8, wherein the ARQ control data of each transmission frame formed at the step (b) includes data for distinguishing each transmission frame from each re-transmission frame formed at the step (g) and data for identifying the transmission sub-blocks contained in each transmission frame, whereas the ARQ control data of each re-transmission frame formed at the step (g) includes only data for distinguishing each re-transmission frame from each transmission frame formed at the step (b).

14. A data transmission system using automatic repeat request function for automatically requesting a re-transmission of data received with an error at a reception side to a transmission side, comprising:

a transmission section including:
first means for forming a transmission frame by dividing transmission data into a plurality of blocks, attaching error detection code to each block to form a plurality of transmission blocks, grouping N transmission blocks together, and attaching one ARQ control data to a group of N transmission blocks where N is an integer;

second means for producing an error correction code for each error block occurring at the reception side as a re-transmission block in response to a re-transmission request signal for said each error block returned from the reception side;

third means for forming a re-transmission frame by grouping M re-transmission blocks produced by the second means together and attaching one ARQ control data to a group of M re-transmission blocks where M is an integer greater than 1; and transmitter means for transmitting transmission blocks of the transmission frame formed by the first means sequentially from the transmission side to the reception side, and transmitting the re-transmission blocks of the re-transmission frame formed by the third means sequentially from the transmission side to the reception side whenever the re-transmission frame is formed by the third means; and a reception section including:
fourth means for detecting a presence of an error in each transmission block transmitted from the transmission side;

memory for storing each transmission block for which the presence of the error is detected by the fourth means as an error block along with a block number identifying said each transmission block;

fifth means for returning the re-transmission request signal for the error block to the transmission side;

sixth means for carrying out an error correction operation for each re-transmission block of the re-transmission frame transmitted from the transmission side in response to the re-transmission request signal returned by the fifth means with respect to each error block stored in the memory to obtain an error correction trial block for each error block;

seventh means for judging each re-transmission block of the re-transmission frame transmitted from the transmission side in response to the re-transmission request signal returned by the fifth means as corresponding to a respective error block when the error correction trial block obtained by the sixth means has no error; and eighth means for adopting the error correction trial block judged said seventh means for said respective error block obtained by the sixth means as a recovered block for said one error block.

15. The data transmission system of claim 14, wherein the reception section further comprises:

ninth means for receiving each transmission block for which the presence of the error is not detected by the fourth means as a correctly received block, and returning an acknowledge signal for the correctly received block to the transmission side.

16. The data transmission system of claim 14, wherein the eighth means also returns an acknowledge signal for said one error block to the transmission side.

17. The data transmission system of claim 14, further comprising:

mean for deleting said one error block in the memory; and means for returning a re-transmission request signal for each error block which is still remaining in the memory to the transmission side after the sixth, seventh, eighth, and deleting means operated with respect to all the re-transmission blocks of the re-transmission frame transmitted from the transmission side.

18. The data transmission system of claim 14, wherein the eighth means adopts the error correction trial block for said one error block as a recovered block for said one error block only when the seventh means judges that there is no other error block for which the error correction trial block obtained by the sixth means has no error.

19. The data transmission system of claim 14, wherein the ARQ control data of each transmission frame formed by the first means includes data for distinguish each transmission frame from each re-transmission frame formed by the third means and data for identifying the transmission blocks contained in each transmission frame, whereas the ARQ control data of each re-transmission frame formed by the third means includes only data for distinguishing each re-transmission frame from each transmission frame formed by the first means.

20. The data transmission system of claim 14, wherein M used by the third means is greater than N used by the first means.

* * * * *